(12) United States Patent
Konrad et al.

(10) Patent No.: US 12,066,638 B2
(45) Date of Patent: Aug. 20, 2024

(54) COLLIMATOR

(71) Applicant: KONRAD GMBH, Radolfzell (DE)

(72) Inventors: Michael Konrad, Radolfzell (DE); Claus Urban, Uhwiesen (CH)

(73) Assignee: KONRAD GMBH, Radolfzell (DE)

( * ) Notice: Subject to any disclaimer, the term of this patent is extended or adjusted under 35 U.S.C. 154(b) by 330 days.

(21) Appl. No.: 17/436,671

(22) PCT Filed: Mar. 5, 2020

(86) PCT No.: PCT/EP2020/055795
§ 371 (c)(1),
(2) Date: Sep. 7, 2021

(87) PCT Pub. No.: WO2020/178366
PCT Pub. Date: Sep. 10, 2020

(65) Prior Publication Data
US 2022/0137425 A1    May 5, 2022

(30) Foreign Application Priority Data
Mar. 6, 2019   (DE) .................. 10 2019 105 622.5

(51) Int. Cl.
*G02B 27/30* (2006.01)
*G01B 11/26* (2006.01)
(Continued)

(52) U.S. Cl.
CPC .............. *G02B 27/30* (2013.01); *G01B 11/26* (2013.01); *G01M 11/0207* (2013.01);
(Continued)

(58) Field of Classification Search
CPC ........ G02B 27/30; G02B 27/32; G02B 27/36; G02B 27/62; G02B 27/34; G01M 11/02;
(Continued)

(56) References Cited

U.S. PATENT DOCUMENTS 1,442,015 A * 1/1923 Tillyer ...................... F41G 1/14
                                                      42/131
4,110,046 A * 8/1978 Baker ................ G01M 11/0228
                                                      356/127
(Continued)

FOREIGN PATENT DOCUMENTS

CN    100378436 C  *  4/2008
CN    201903291 U  *  7/2011
(Continued)

OTHER PUBLICATIONS

International search report for patent application No. PCT/EP2020/055795 dated Jun. 4, 2020.
(Continued)

*Primary Examiner* — Gordon J Stock, Jr.
(74) *Attorney, Agent, or Firm* — Bachman & LaPointe, P.C.

(57) ABSTRACT

The invention relates to a collimator for testing a camera (6), comprising a collimator housing (1), wherein the collimator housing (1) has a longitudinal wall (8, 9) and two end walls (10, 11), the first end wall (10) having a light source (2) and the second end wall (11) having a lens (5), a reticle (4) being disposed between the lens (5) and the light source, with the reticle (4) being disposed obliquely with respect to the lens (5) and/or obliquely with respect to the longitudinal wall (8, 9) in the collimator housing (1).

6 Claims, 1 Drawing Sheet

(51) Int. Cl.
*G01M 11/02* (2006.01)
*G02B 27/32* (2006.01)
*G02B 27/34* (2006.01)
*G02B 27/62* (2006.01)
*H04N 17/00* (2006.01)
*H04N 23/56* (2023.01)
*H04N 23/695* (2023.01)

(52) U.S. Cl.
CPC .... *G01M 11/0221* (2013.01); *G01M 11/0264* (2013.01); *G02B 27/32* (2013.01); *G02B 27/34* (2013.01); *G02B 27/62* (2013.01); *H04N 17/002* (2013.01); *H04N 23/56* (2023.01); *H04N 23/695* (2023.01)

(58) Field of Classification Search
CPC ......... G01M 11/0207; G01M 11/0214; G01M 11/0221; G01M 11/0228; G01M 11/0235; G01M 11/0242; G01M 11/025; G01M 11/0257; G01M 11/0264; G01M 11/0271; G01M 11/0278; G01M 11/0284; G01M 11/0292; H04N 17/002; H04N 23/54; H04N 23/55; H04N 23/56; H04N 23/695; G01B 11/14; G01B 11/26; G01B 11/27; G01B 11/272; G03B 43/00
See application file for complete search history.

(56) References Cited

U.S. PATENT DOCUMENTS

| | | | | | |
|---|---|---|---|---|---|
| 4,199,220 | A | * | 4/1980 | Casagrande | G02B 27/40 348/335 |
| 5,455,715 | A | | 10/1995 | Okubo | |
| 6,025,908 | A | * | 2/2000 | Houde-Walter | G01B 11/26 356/153 |
| 6,346,981 | B1 | * | 2/2002 | Karbe | G01M 11/0292 356/124 |
| 6,366,349 | B1 | * | 4/2002 | Houde-Walter | G02B 5/32 356/153 |
| 8,578,646 | B2 | * | 11/2013 | Joannes | F41G 1/48 42/113 |
| 9,213,228 | B2 | * | 12/2015 | Apel | G03B 43/00 |
| 9,535,257 | B2 | * | 1/2017 | Johnson | G02B 27/30 |
| 2009/0265974 | A1 | * | 10/2009 | Joannes | F41G 1/48 235/404 |
| 2010/0020180 | A1 | * | 1/2010 | Hill | G03B 43/00 348/188 |

FOREIGN PATENT DOCUMENTS

| | | | | | |
|---|---|---|---|---|---|
| CN | 202393958 | U | * | 8/2012 | |
| CN | 106768872 | A | * | 5/2017 | ............ G01M 11/02 |
| CN | 108278923 | A | * | 7/2018 | |
| DE | 19823844 | C1 | | 10/1999 | |
| DE | 102004020881 | A1 | | 11/2005 | |
| DE | 102004056723 | A1 | | 5/2006 | |
| DE | 102007003681 | A1 | | 8/2007 | |
| DE | 102013212097 | A1 | | 1/2015 | |
| DE | 102014209040 | A1 | | 11/2015 | |
| EP | 2148501 | A2 | | 1/2010 | |
| EP | 3076148 | A1 | | 10/2016 | |
| EP | 3166312 | A1 | * | 5/2017 | ............. G02B 27/30 |
| EP | 3076148 | B1 | * | 5/2019 | ........ G01M 11/0264 |
| GB | 2193817 | A | * | 2/1988 | ............... F41G 1/30 |
| JP | 57172221 | A | | 10/1982 | |
| JP | 2019078941 | A | * | 5/2019 | |
| KR | 20140135543 | A | * | 11/2014 | |
| WO | 9950636 | A1 | | 10/1999 | |
| WO | 0196933 | A1 | | 12/2001 | |
| WO | WO-2020119226 | A1 | * | 6/2020 | ......... G01N 21/6458 |
| WO | WO-2020148574 | A1 | * | 7/2020 | ............ G01M 11/02 |

OTHER PUBLICATIONS

International examination report for patent application No. PCT/EP2020/055795 dated Feb. 25, 2021.
German request for examination for patent application No. 10 2019 105 622.5 dated Nov. 4, 2019.
German office action for patent application No. 10 2019 105 622.5 dated Oct. 5, 2021.

* cited by examiner

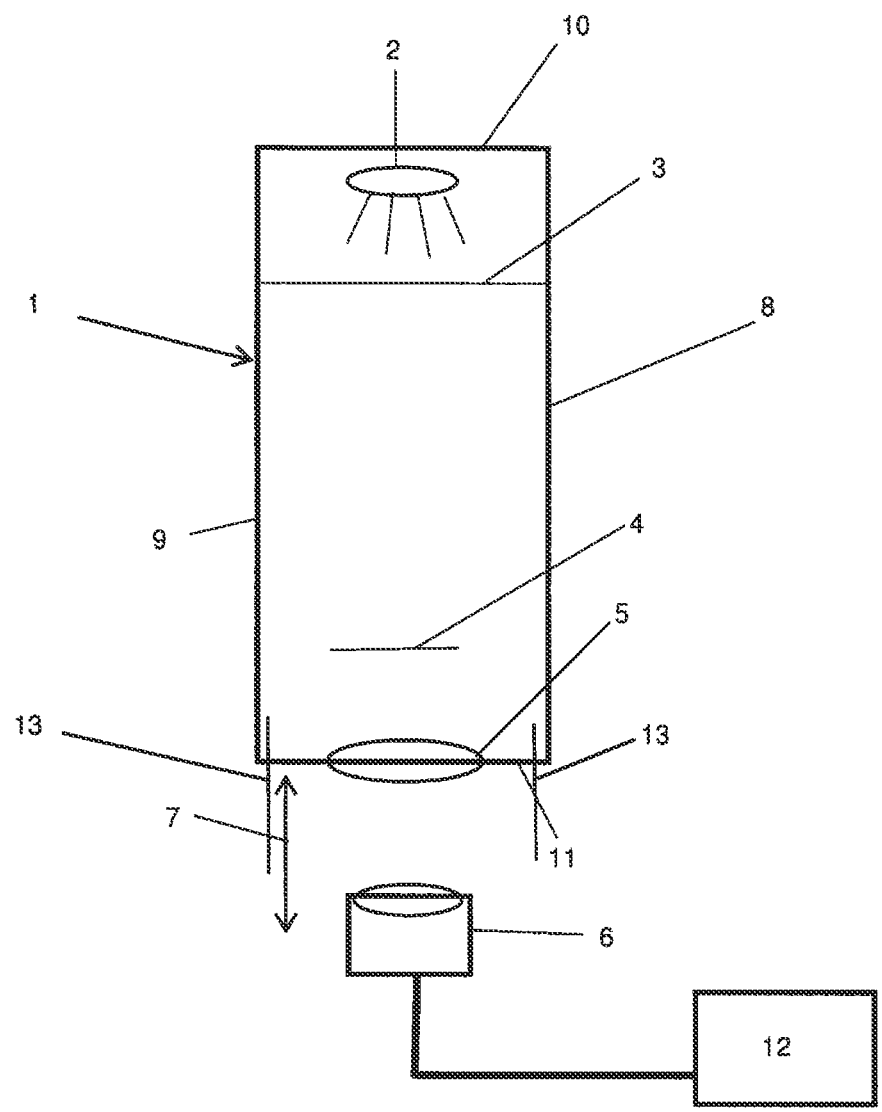

COLLIMATOR

BACKGROUND OF THE INVENTION

The present invention relates to a collimator.

Such collimators are already known and in use in a variety of forms and designs. For example, the DE 10 2007 003 681 A1 discloses a method and a device for analyzing an optical device. Here, an illumination device generates a test beam, which is detected by an optical device and a position-resolving sensor device, whereby they are arranged in a reference position to each other.

Reference is also made to DE 10 2004 056 723 A1, which discloses a device for geometric calibration of an orthoelectronic sensor system, which is to be used in particular for digital cameras. The signals of the photosensitive sensors are recorded in an evaluation and control unit.

The DE 10 2014 209 040 A1 discloses a method for calibrating a measuring device, wherein measurement signals are generated and determined, and the process is repeated up to six times to test the measuring device.

In addition, reference is made to the DE 10 2004 020 881 A1. There a method and a device for the geometrical orthoelectronic measuring image camera is disclosed, wherein calibrating a coherent monochromatic light source and at least one means for generating a defined test structure is present and its generated test structure is imaged via the optics of the measuring image camera on its focal plane, wherein the means is formed as a slit diaphragm.

Reference is also made to the 198 23 844 C1. There, a lens tester is disclosed which has a holder attached to a tripod for holding a left test piece, and a rear-illuminated test object as well as an imaging objective and a detector device for evaluating the image of the test object are present. In this case, the objective is combined with the detector device to form a unit, wherein the lens test piece is an objective lens test piece, the test object is arranged in the focal plane of the lens objective test piece within the holder, and the imaging objective is a collimator objective.

Collimators are used to determine the quality of cameras composed of a light-sensitive sensor element and an imaging optic. In particular, collimators can be used to geometrically align the imaging optics and light-sensitive sensor element components with each other during their assembly into the camera. After alignment, the components of the camera are fixed in place, for example by bonding with adhesives that can be hardened by ultraviolet light.

A prominent feature of collimators is that a localized pattern-bearing element localized in the object plane of the collimator, called a reticle, appears to the camera at a certain adjustable distance.

A collimator consists of an illumination unit that illuminates a pattern-bearing optical element called a reticle. The light beams emitted by this reticle are then imaged into the working distance of the collimator by an optical system, often designed as a lens system. The working distance of the collimator can be adjusted by moving the optics or the lens system relative to the reticle. As an example, when the working distance is set to infinity, parallel bundles of beams are generated from each object point to the reticle at the output of the collimator. If the reticle were a pinhole, a parallel bundle of beams would be obtained at the output of the collimator—a collimated beam of light spreading along the optical axis of the collimator. Under the assumption of diffuse illumination of the reticle, the diameter of this collimated light beam is limited by the aperture of the lens or lens system. The working distance of the collimator is negated with respect to the working distance of the camera to be tested with it. The working distance of a camera is positive for objects located at a distance in front of the camera, for example, a camera with working distance 1 m images objects at just this distance with the best contrast. The collimator used for this purpose has the working distance of −1 m.

For any pattern of the reticle, for each light emitting point, an equal collimated light beam is generated at the collimator output, only under a direction inclined to the optical axis of the collimator, determined by the position of the point on the reticle and the focal length of the lens or lens system. It is valid for the direction of the light beam $\tan(\alpha)=x/f$ and $\tan(\beta)=y/f$ with f the focal length of the optics or the total focal length of the lens system, x the distance of the point from the optical axis in x-direction and y the distance of the point from the optical axis in y-direction. X- and y-direction form an orthogonal coordinate system with the optical axis. To simplify the description, it is assumed that the surface of the reticle is perpendicular to the optical axis. For an extended reticle, the light will diverge from the exit of the collimator and the dimension of the light beam will increase with increasing distance.

A camera placed in front of a collimator on its optical axis images the reticle. The distance to the reticle seen by the camera corresponds to the set working distance of the collimator. A sharp image is obtained when the working distances of the collimator and the camera or their focus settings match. This is independent of the distance between the collimator and the camera. However, it can be observed that the image size of the reticles on the camera decreases with increasing collimator to camera distance. This can be explained by the previously mentioned effect that light beams from areas of the reticle with a distance to the optical axis spread out under an angle to the optical axis and therefore do not hit the camera entrance pupil from a certain distance.

In the prior art, it is stated that collimators have a focal length of f=100 mm or preferably longer. It is also desired that the exit aperture of the collimator should be as long as possible, i.e. as large a diameter as possible. diameter. Values for the diameter in the range of 30 mm are common. These can deviate upwards and downwards without restriction.

In order to obtain images at several positions in the image of a camera, collimators are arranged in groups, where usually one collimator is placed on the optical axis in front of the camera and further collimators are distributed at different angles in azimuth and elevation mostly evenly on the image field of the camera.

In the use of a collimator group for the adjustment of a camera, the camera lens is then adjusted to the image sensor in such a way that, if possible, all images of the various collimators are sharply imaged on previously calculated positions in the image. An arrangement of five collimators in a group is often used for this purpose, with one collimator on the optical axis of the camera and four collimators are arranged on the image diagonals at about 70 percent of the aperture angle of the camera.

A special field of application is the camera assembly with regard to the adjustment of the lens to the image sensor and their permanent fixation in automated production lines in mass production, for example in the automotive sector. Due to the high quantities and the cost pressure in production, there are special requirements for the camera assembly process.

In the camera adjustment, MTF curves are scanned step by step in six degrees of freedom. These are the focus distance z and the two tilt angles of the sensor surface, for which a dependence of the MTF values exists. The other degrees of freedom, the lateral displacements x and y and the rotation around the optical axis, have no influence on the measured MTF values, but determine the centering and rotation of the image sensor to the geometry of a reference axis system determined by the collimator arrangement. For each step, an image is captured and analyzed. This results in a function of the measured MTF values from the respective parameter—z and the two tilt angles. The ideal position is determined by the positions of the maxima of the respective curves. The adjustment process according to the state of the art is therefore very time-consuming.

SUMMARY OF THE INVENTION

The object of the present invention is to overcome the disadvantages of the prior art. The adjustment process of a lens to the image sensor should be possible on the basis of a single image capture or with a reduced number of image captures compared to the prior art, whereby the adjustment process can be performed faster compared to the prior art. Collimators in the prior art are large. As a result, they can only be grouped together in such a way that the diameters do not touch at the front. Thus, the distance collimator to camera is also large, which further increases the dimensions of the overall construction.

The features disclosed herein lead to the achievement of the object.

Preferred embodiments are also disclosed herein and can be found in the dependent claims.

The improvement to the prior art is achieved by tilting the object plane of the collimator, on which the reticle is located, with respect to the optical axis by an angle deviating from 90 degrees in combination with a short focal length of the collimating optics, this focal length being similar to the focal length of the lens of the camera to be examined. It should be emphasized that only the indicated combination provides the desired result. Especially for short focal lengths of about 1 mm to 10 mm, as they are often used for cameras in the automotive field, such a design is not possible by the state of the art. As a reticle, for example, a crosshair is used in which one line is arranged along the tilt axis of the object plane and the second line is arranged perpendicular to it. For the latter case, there is a variation of the working distance of the collimator along the direction perpendicular to the tilt axis of the object plane.

For the camera placed in front of the collimator, the resulting image is sharp only in the image area where the effective working distance of the collimator matches the working distance of the camera. In this example, this is true for a line of pixels on the camera image which has the orientation parallel to the tilt axis of the collimator and for which the working distances of the collimator and the camera match. This line can be located at any position inside or outside the camera image.

Areas next to this line of sharpest focus will be blurred in the camera image. As a direct result of this characteristic, the tilted line of the crosshairs will have a thinnest point where the working distances of the collimator and the camera coincide, and from this thinnest point, the line width increases in both directions.

The line perpendicular to the tilted line of the collimator has the width corresponding to the tilted line at the intersection of both lines. Assuming that the optical axes of the collimator and the camera are aligned, this line is placed in the center of the camera image. The camera adjustment in terms of maximum image sharpness at the point of the camera image with the image of the collimator pattern, is achieved when this line intersects the tilted line at its narrowest point. Without limitation, the method also allows to set an offset with respect to the position of maximum sharpness.

The position of the narrowest point of the tilted line in the image clearly shows whether the camera lens is in front of or behind the optimum position in relation to the image sensor. There is also a relationship between the line width and the real distance of the lens from this optimum position in relation to the image sensor. This makes it possible to determine the distance and the direction for the adjustment of the camera lens in relation to the image sensor with an image capture.

For a camera adjustment, several collimators are used in a group with defined geometry to the camera. This arrangement is possible using micro lenses. This ensures that the requirement for a short focal length is met and conforms to the geometric arrangement of the collimators in the collimator group and the corresponding space requirement.

This makes the camera assembly much faster, since no MTF curves have to be run step by step.

The effect of a tilted reticle becomes more visible the closer the focal length of the collimator is to the focal length of the camera lens. Typical focal lengths of camera lenses in the automotive range are between about 1 mm and 10 mm. The size d_image of the image of the reticle on the camera can be given by the ratio of the focal lengths of the collimator f_col and the camera f_cam as a first approximation. Effects, like an occurring distortion, are not taken into account. For the reticle size d_ret follows d_image=d_ret×f_cam/f_col. Furthermore, the maximum achievable defocus along the inclined line of the reticle can be calculated from the equation 1/f=1/s_object+1/s_image. Example values are given in the following table. Here the reticle is tilted by 45° and all beams hit the entrance pupil of the camera.

| Focal length f_coll | 100 mm | 10 mm |
| Focal length f_cam | 1 mm | 1 mm |
| Reticle size d_ret | 10 mm | 10 mm |
| Image size d_image | 0.1 mm | 1 mm |
| Maximum defocus camera image | 0.5 μm | 91 μm |

A collimator for this task must therefore be small and have a focal length in the range of about 10 mm. Micro lenses are used for this purpose. These can be arranged in a group a few mm away from the camera.

Only in this combination with micro lenses is the use of tilted reticles effectively possible, so that on the camera the position of the lens can be determined and adjusted from one image.

To enlarge the image of a collimator on the camera, an optical system is used to guide the light beams running outward from the collimator to the entrance pupil of the camera lens without changing the divergence of the individual beam bundles or without changing the working distance of the collimator. This extends the measuring range. One embodiment of the optical system is an arrangement of mirrors between the collimator lens and the camera. The mirror surfaces are preferably parallel to the optical axis of the collimator and perpendicular to the lateral propagation direction of the reticle patterns, in the case of a reticle four mirrors are arranged perpendicular to the spreading direction in x and y of the lines. This directs beams to the camera that would not hit the entrance pupil of the camera without mirror optics. In the camera image these parts appear in extension of the lines of the crosshairs but mirrored at their crossing point. Another embodiment of the optical system is an afocal optic, which is placed between the collimator lens and the camera and guides the light beams coming from the collimator to the camera without changing the working distance of the collimator. In the camera image, the image of the crosshairs appears larger. Small influences on the working distance caused by optical aberrations of these optics do not restrict the use of these optics as long as the influence on the inspection or adjustment of the camera is negligible. The optical systems can alternatively be integrated into the collimator.

The realization of compact system for camera mounting is realized.

The compact system for camera mounting is cost effective.

The compact camera mounting system is modular and allows easy replacement in a camera mounting line for conversion to different camera variants.

The collimator according to the invention is used for testing a camera. This is a CMOS camera, a CCD camera, an analogue camera or other cameras. For this purpose, the collimator has a collimator housing. The collimator housing is a higher or a three to four-walled cylindrical construction. These are longitudinal walls. The cylindrical construction is closed at both ends to provide shielding from ambient light inside the collimator housing and to prevent distortion of the light beams generated by the light source.

In the context of the invention, the two closed ends are referred to as end walls. Here, the first end wall comprises a light source and the second end wall comprises an optic. Further, a reticle is arranged in the collimator housing between the optics and the light source. The reticle has an imprinted pattern or image or other target application or another target application, the information of which is stored in a computer.

In this case, the reticle in the collimator housing is arranged obliquely to the optics and/or obliquely to the longitudinal wall. In this context, oblique means non-parallel. In this case, one edge or corner of the reticle is arranged closer to the optics than the other corners or edges. This has the advantage that the pattern, image or target application shown on the reticle shows the pattern simultaneously at different distances from the optics due to the different distances from the optics, thus allowing the camera to set up in a more targeted and faster manner.

A diffuser is arranged between the reticle and the light source. The diffuser causes the light beams sent out by the light source to produce a defined light in a defined radiation in the collimator housing. Without restriction, the illumination of the reticle can also take place with other illumination methods.

The inner wall of the illumination volume in front of the reticle can be made reflective. The mirroring causes the light beams of the light source, which emit through the diffuser, to be mirrored back by the longitudinal walls. This has the advantage that the overall length of the collimator housing can be further reduced.

The camera is adjustable. This means that the camera can be adjusted towards the lens or away from the lens. In this case, the camera is adjusted and its parameters and the ideal distance to the lens are recorded in the computer.

Further, separate protection is sought for a method of testing a camera. Thereby the collimator is used with the following steps for testing the camera:
the light source illuminates the oblique arranged reticle;
the camera captures an image generated by the reticle through the lens;
the camera is shifted towards or away from the lens, whereby the computer thereby performs an ACTUAL/NOMINAL comparison.

The light source shines through the diffuser to create defined conditions in the collimator housing.

BRIEF DESCRIPTION OF THE FIGURES

Further advantages, features and details of the invention result from the following description of preferred embodiment and from the drawing; this shows in the FIGURE a schematic sectional drawing of the collimator according to the invention.

DETAILED DESCRIPTION

A collimator housing 1 is shown in the FIGURE. In the embodiment shown, the collimator housing 1 consists of four longitudinal walls, the first longitudinal wall 8 and the second longitudinal wall 9 being shown here. The two longitudinal walls 8, 9 are connected at one end by a first end wall 10 and at the other end by a second end wall 11.

Here, the first end wall 10 comprises a light source 2. The second end wall 11 comprises a lens 5.

In addition, the two longitudinal walls 8, 9 comprise a mirroring 13, the mirroring 13 being provided on the inner side of the collimator housing 1 to mirror light beams emitting from the light source 2, if necessary. In the embodiment shown, the mirroring 13 extends out of the collimator housing 1 towards the camera 6. In another embodiment, the mirroring is exclusively on the longitudinal walls 8, 9.

Furthermore, a diffuser 3 is arranged in the collimator housing 1 between a reticle 4 and the light source 2. The reticle 4 is arranged obliquely to the lens 5 in the embodiment shown. It is also arranged obliquely to the second end wall 11 or to one of the longitudinal walls 8, 9.

Further, a shift direction 7 indicates how a camera 6 can be shifted toward the lens 5 or shifted away from the lens 5. It is further shown that the camera 6 is connected to a computer 12. Here, the computer 12 is designed in such a way that the images taken by the camera 6 are recorded in an ACTUAL/NOMINAL comparison and compared with the data stored by the reticle 4.

In doing so, the camera 6 can be moved towards or away from the lens 5 by a device not shown in more detail.

REFERENCE LIST 1 collimator housing
2 light source
3 diffuser
4 reticle
5 lens
6 camera
7 shift direction
8 first longitudinal wall
9 second longitudinal wall
10 first end wall
11 second end wall
12 computer
13 mirroring

The invention claimed is:

1. Collimator for testing a camera (6) with a collimator housing (1), wherein the collimator housing (1) has a longitudinal wall (8, 9) and two end walls (10, 11), wherein the first end wall (10) has a light source (2) and the second end wall (11) has a lens (5), wherein a reticle (4) is arranged between the lens (5) and the light source (2), wherein the reticle (4) is arranged in the collimator housing (1) obliquely to the lens (5) and/or obliquely to the longitudinal wall (8, 9), and wherein the longitudinal wall (8, 9) has a mirroring (13) which is an arrangement of mirrors between the lens (5) and the camera (6), in order to guide rays to the camera (6) which would not hit an entrance pupil of the camera (6) without mirror optic, wherein the mirroring (13) extends out of the collimator housing (1) towards the camera (6).

2. Collimator according to claim 1, wherein a diffuser (3) is arranged between the reticle (4) and the light source (2).

3. Collimator according to claim 1, wherein the camera (6) is connected to a computer (12), and wherein the computer is configured to record images taken by the camera (6) and compare the images with data stored of the reticle (4).

4. Collimator according to claim 3, wherein the camera (6) is adjustable, and wherein the computer (12) is further configured to store parameters of the camera (6) and distance to the lens (5).

5. Method for testing a camera (6) with a collimator according to claim 1, comprising the following steps:
- the light source (2) illuminates the obliquely arranged reticle (4);
- the camera (6) captures an image generated by the reticle (4) through the lens (5);
- the camera (6) is shifted towards or away from the lens (5), whereby a computer (12) thereby performs an ACTUAL/NOMINAL comparison.

6. Method according to claim 5, wherein the light source (2) shines through a diffuser (3).

* * * * *